Sept. 30, 1952 E. A. VERRINDER 2,612,277
BOX DUMPER
Filed May 24, 1951 9 Sheets-Sheet 3
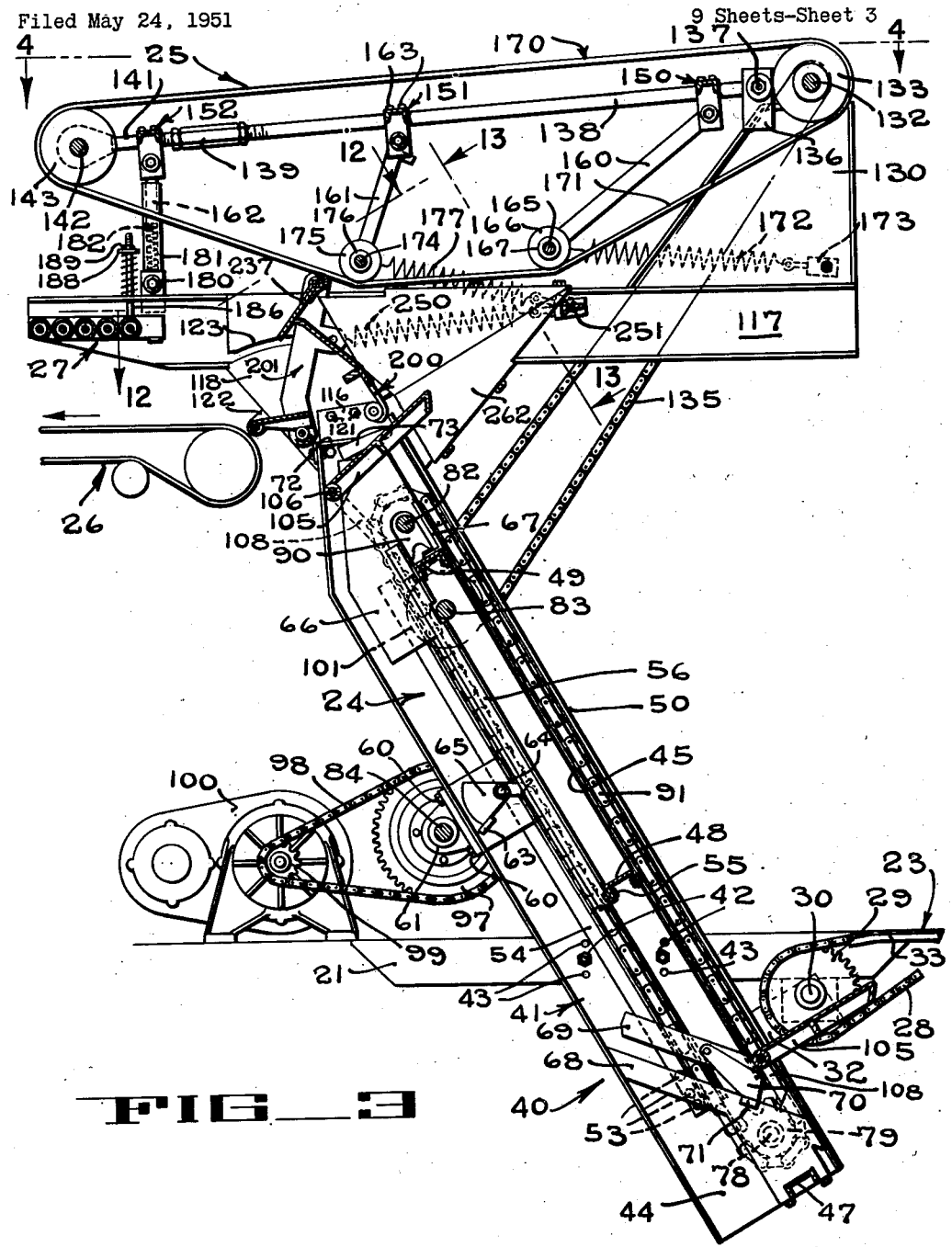
FIG_3
INVENTOR
ERNEST A. VERRINDER
BY Hans G. Hoffmeister
ATTORNEY

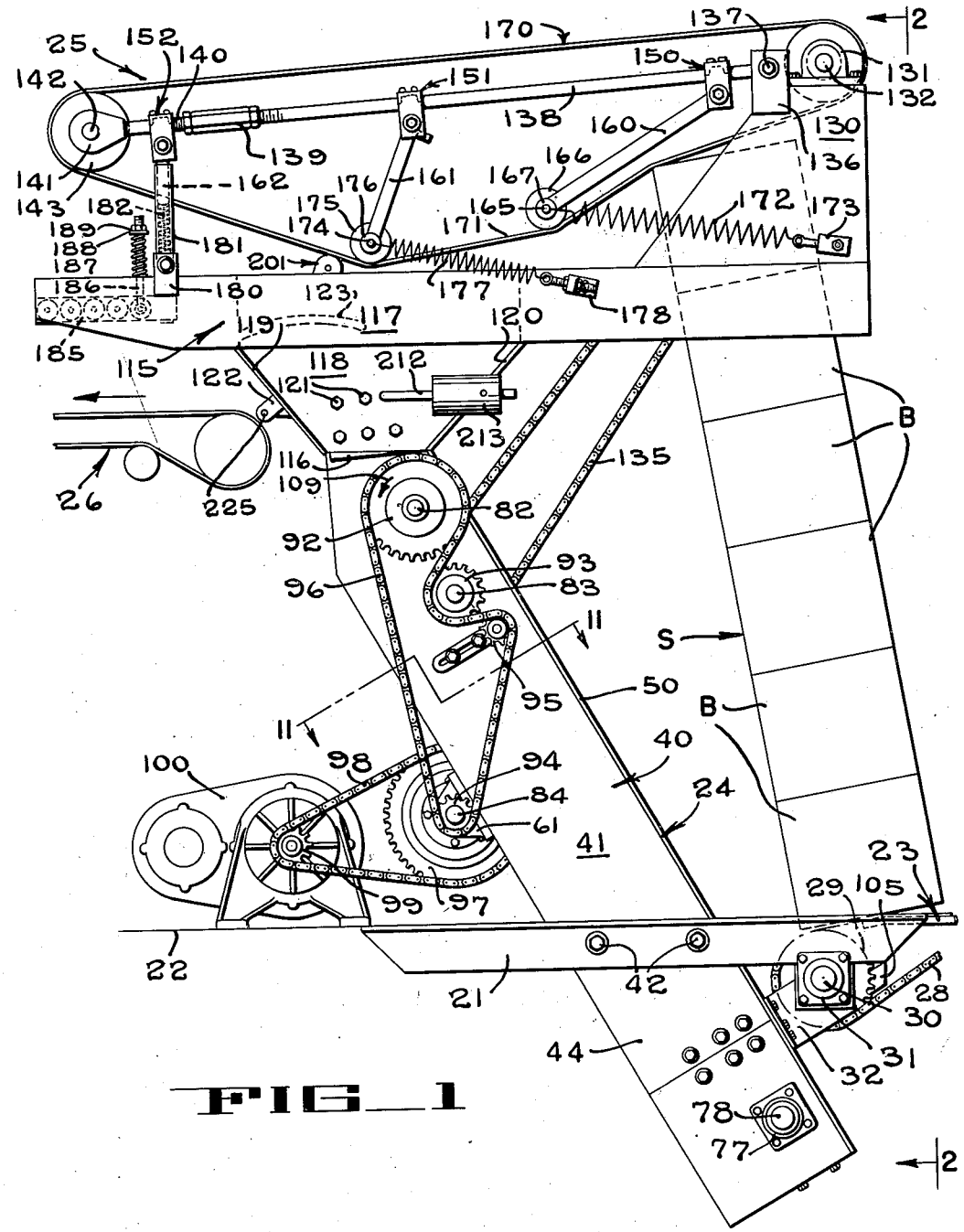
FIG_1

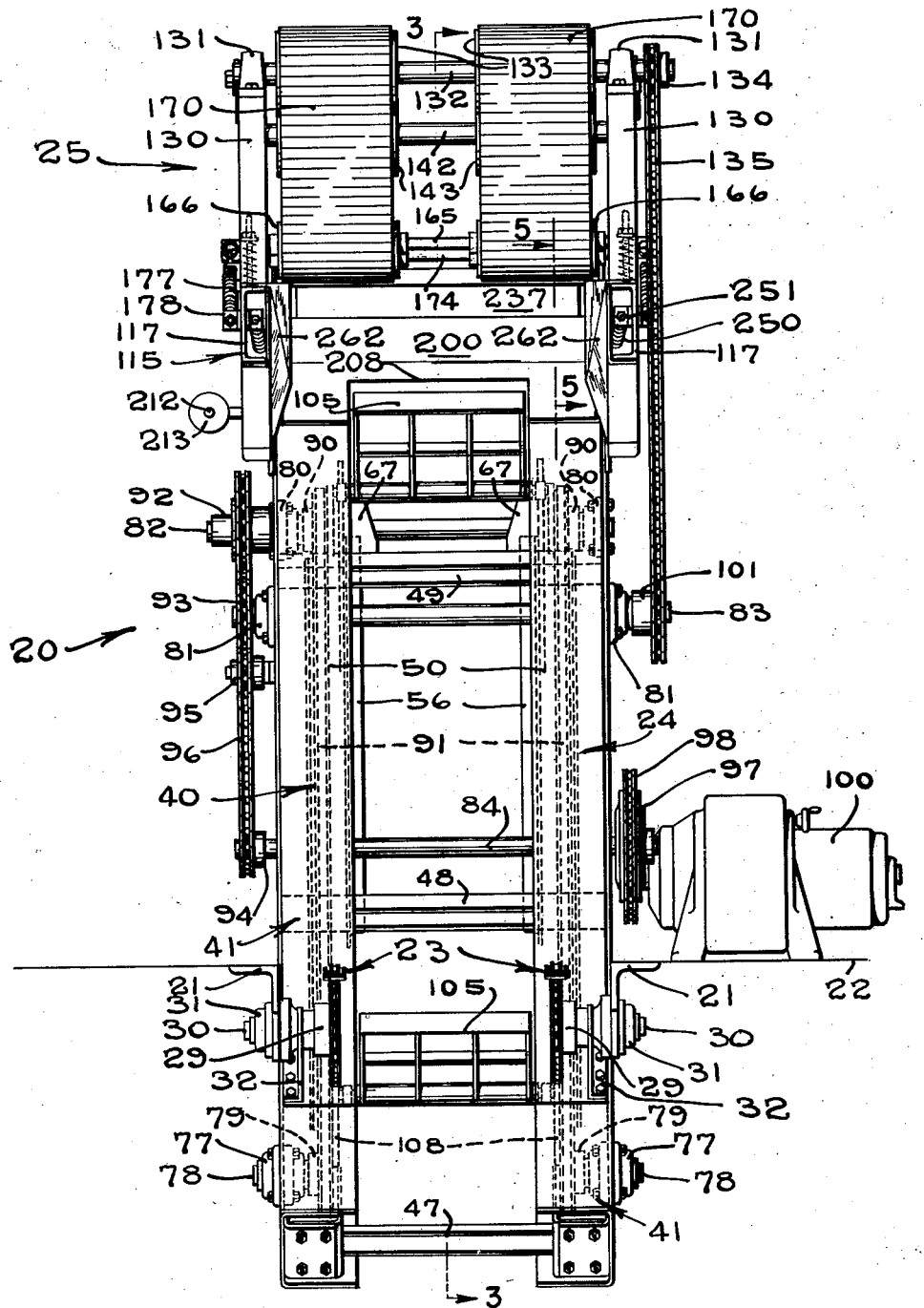

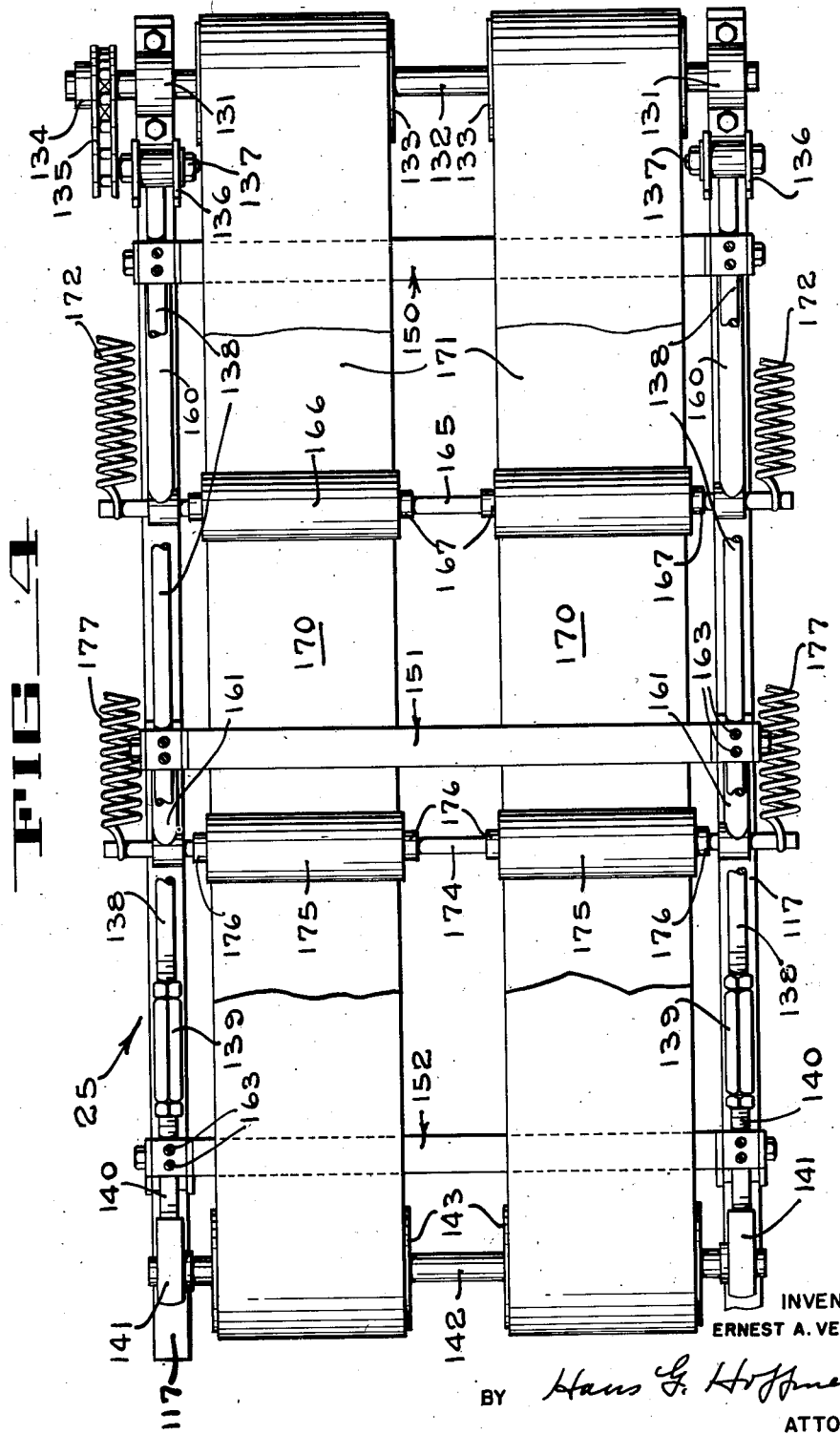

Sept. 30, 1952 E. A. VERRINDER 2,612,277
BOX DUMPER
Filed May 24, 1951 9 Sheets-Sheet 5
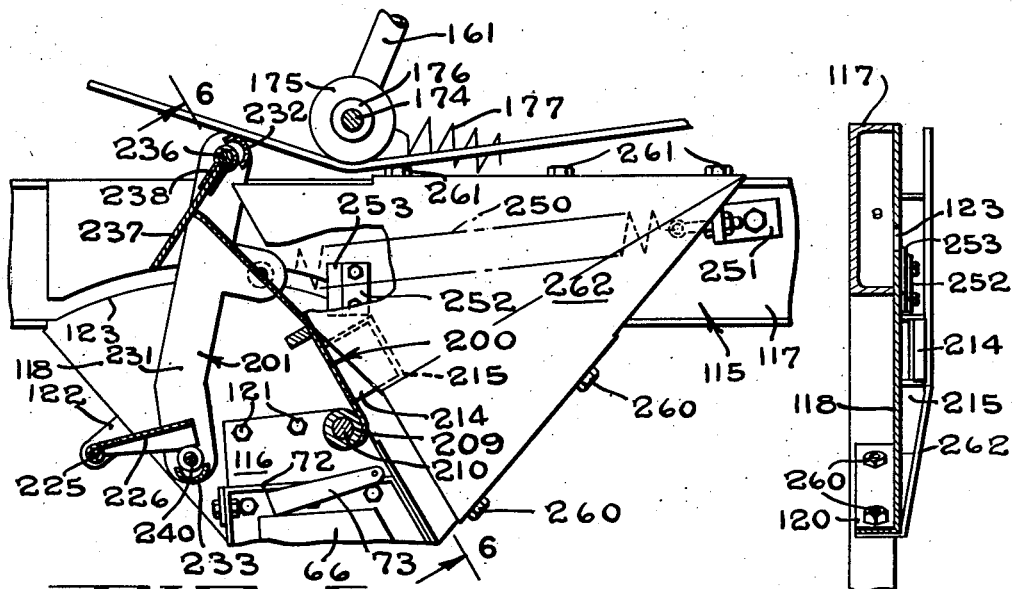
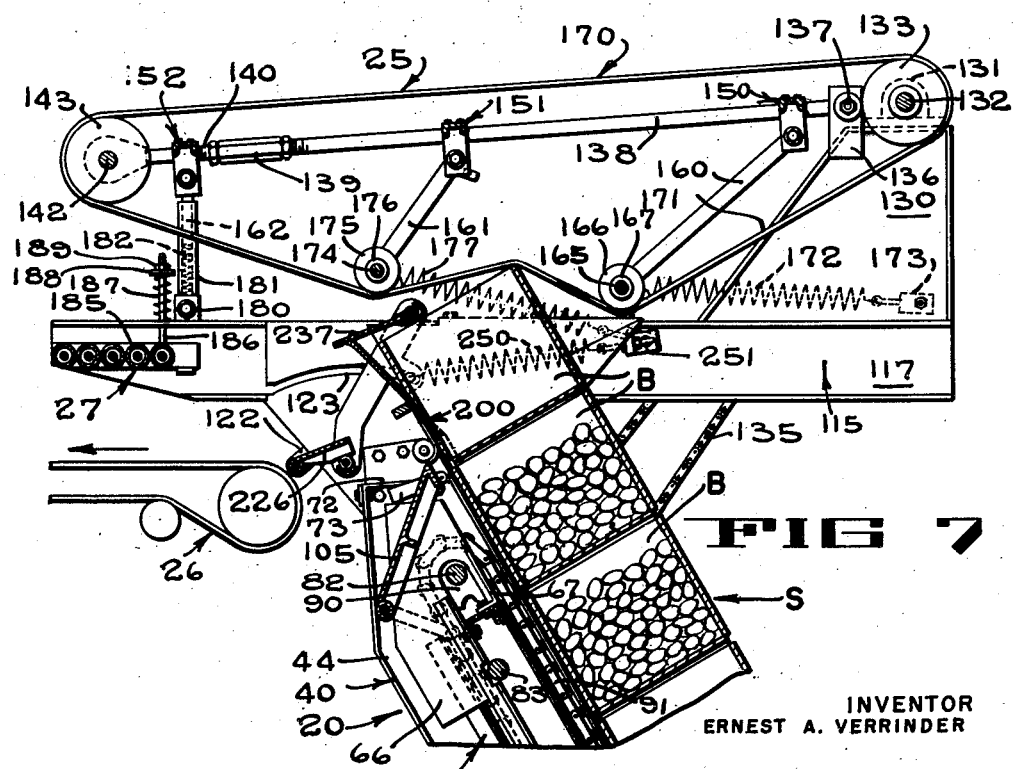
INVENTOR
ERNEST A. VERRINDER
BY Hans G. Hoffmeister
ATTORNEY Sept. 30, 1952 E. A. VERRINDER 2,612,277
BOX DUMPER
Filed May 24, 1951 9 Sheets-Sheet 6
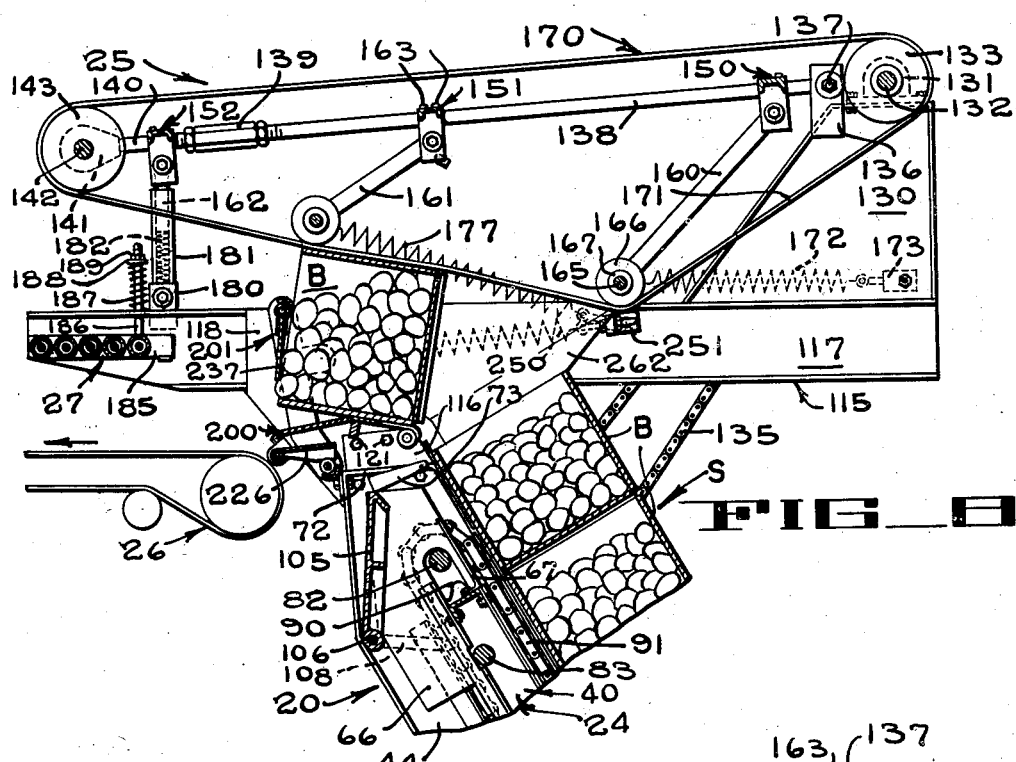
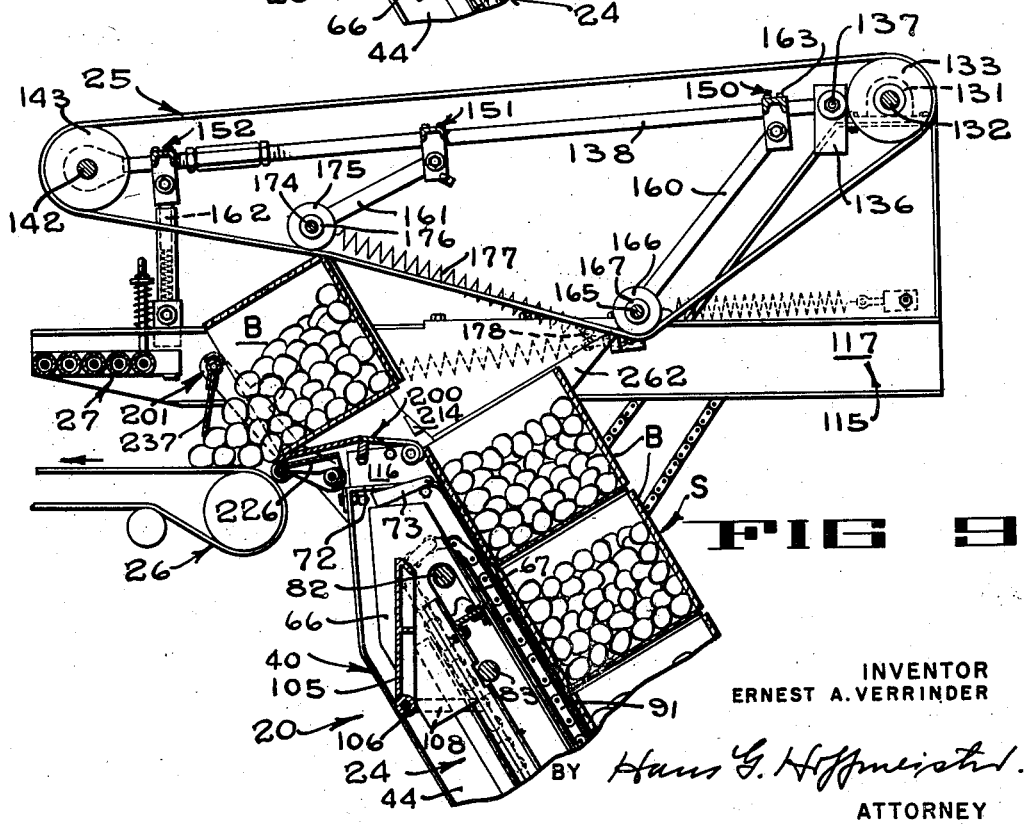
INVENTOR
ERNEST A. VERRINDER
BY Hans G. Hoffmeister
ATTORNEY

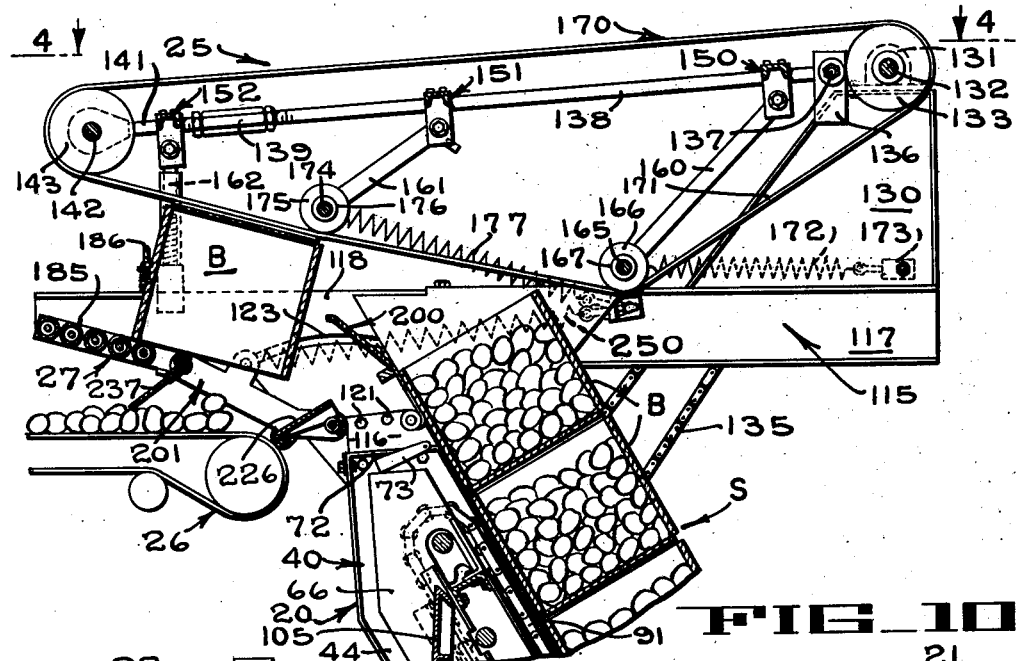
FIG_10
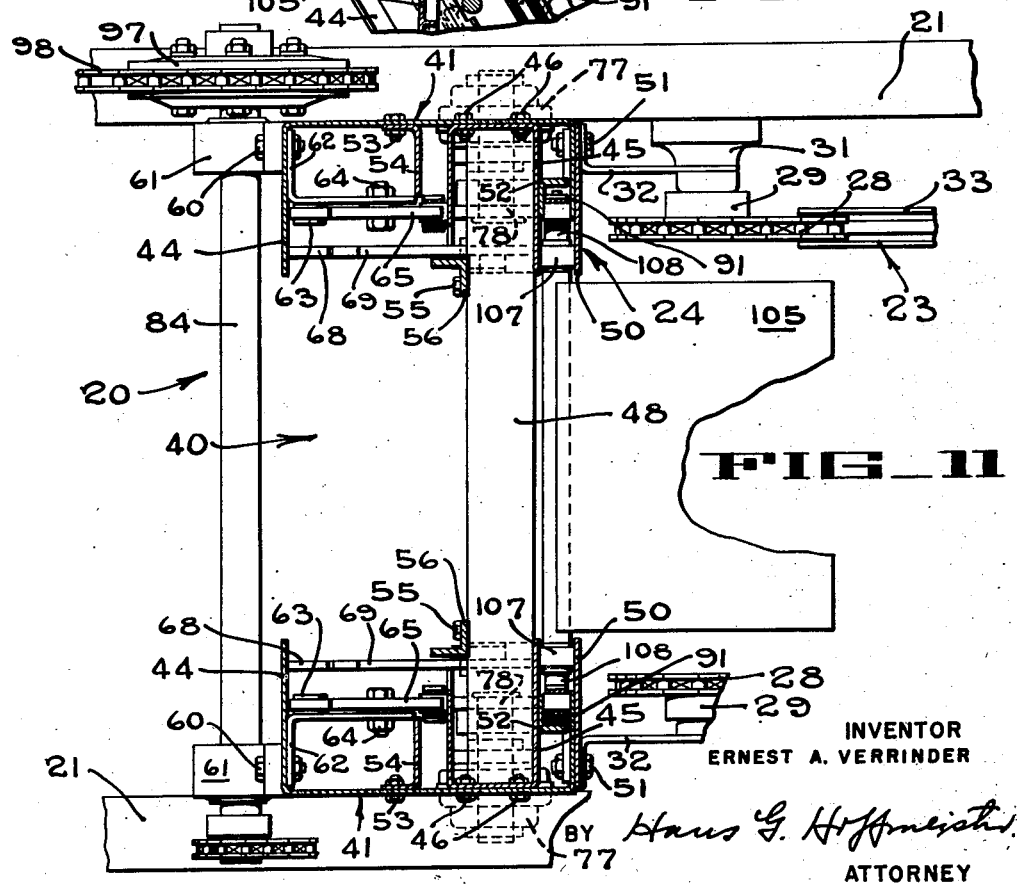
FIG_11
INVENTOR
ERNEST A. VERRINDER
BY Hans G. Hoffmeister
ATTORNEY

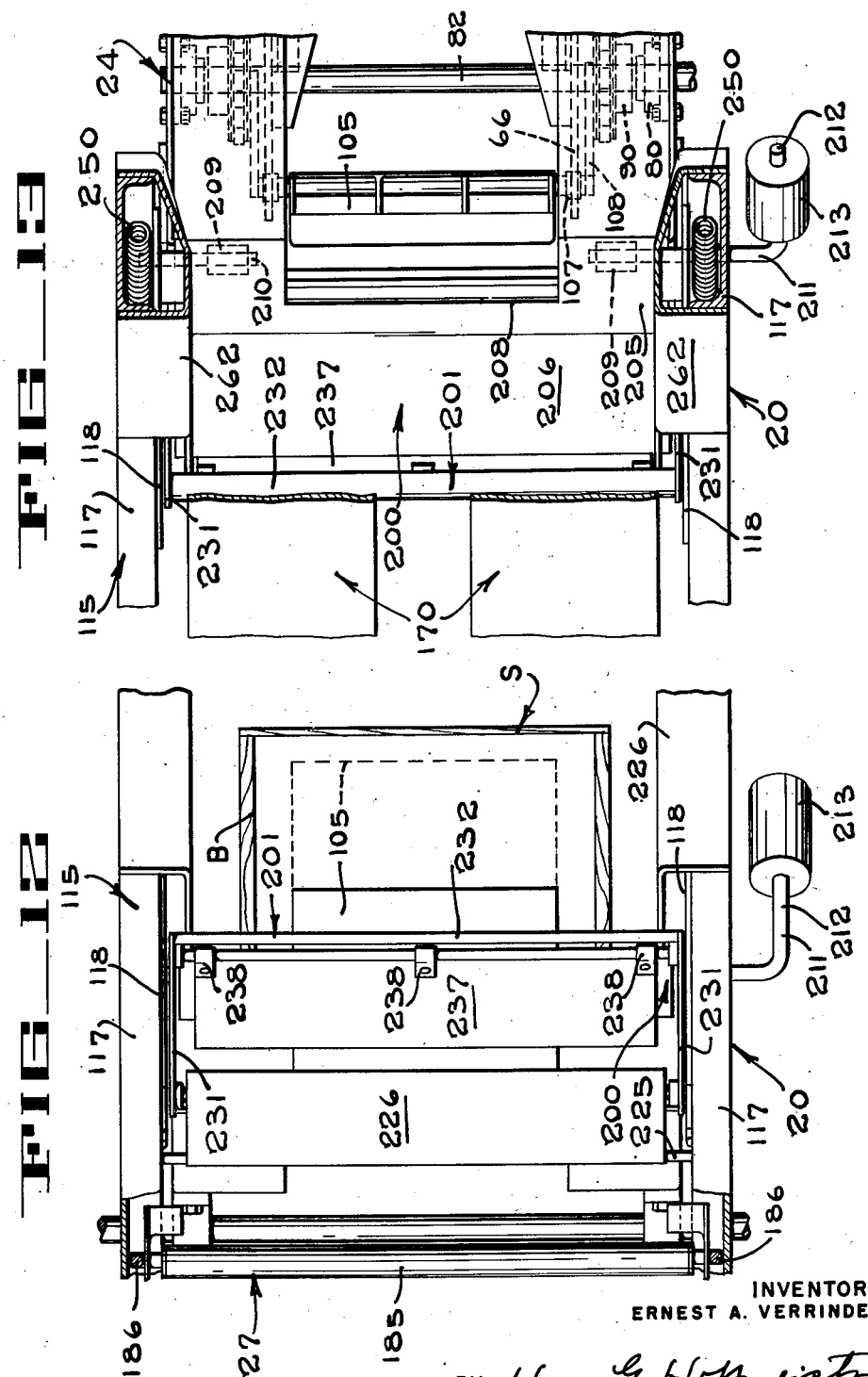

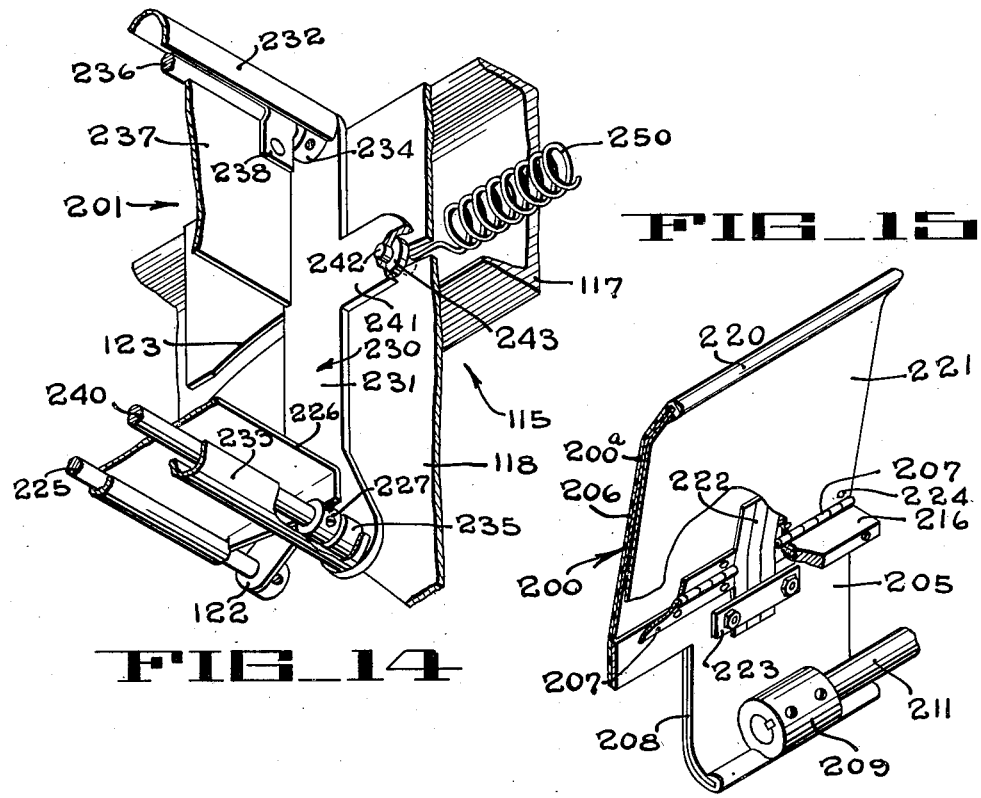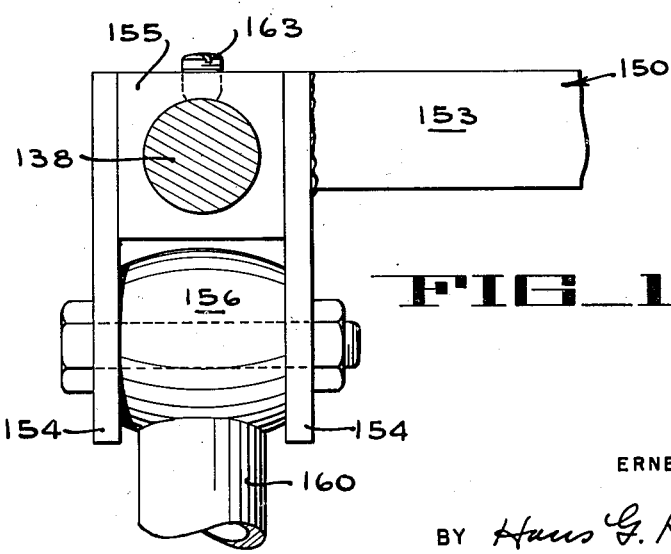

Patented Sept. 30, 1952

2,612,277

UNITED STATES PATENT OFFICE 2,612,277

BOX DUMPER

Ernest A. Verrinder, Riverside, Calif., assignor to Food Machinery and Chemical Corporation, San Jose, Calif., a corporation of Delaware Application May 24, 1951, Serial No. 227,978

11 Claims. (Cl. 214—1.1)

This invention relates to the art of handling a loose product in bulk in open top boxes and is particularly useful in dumping the contents from such boxes.

The present application covers an improvement in the box dumpers shown in my co-pending applications for U. S. Letters Patent Serial No. 168,789 filed June 17, 1950, and Serial No. 182,924 filed July 28, 1950. These prior applications cover different forms of a box dumper in which a stack of boxes is elevated into frictional contact with a horizontally travelling overhead belt conveyor, this contact causing the boxes of the stack to be successively rolled in the direction of travel of the overhead conveyor so that the contents of each box are dumped onto a loose product conveyor and the empty boxes are successively propelled onto an empty box conveyor.

In the first of said prior applications the elevator received the stack at a relatively slight inclination from vertical so that the stack could readily rock from an upright position into alignment with and resting on the elevator without too great a shock to the product in the boxes. To effect a direct delivery of the product from the boxes onto the product conveyor at a relatively low level, the second of said co-pending applications disclosed an elevator set at a comparatively steep inclination relative to vertical and positioned the box dumping conveyor so as to be engaged by the uppermost box of each stack while the stack is being fed to the elevator whereby this conveyor regulates the speed with which the stack tilts onto the elevator to prevent undue shock to the product by the impact of the stack against the elevator.

In both of said prior applications each box, as it is being dumped by the overhead conveyor, is rolled over a hump-shaped fulcrum member which terminates in a downwardly inclined delivery board, the latter delivering the product directly onto the loose product conveyor.

The rolling of the box in these dumpers is smooth and controlled as the box does not leave contact with the overhead conveyor until after the dumping is completed. As the box reaches a certain semi-inverted position, however, the loose product therein gravitates from the box in a downward surge onto the delivery board and from this onto the loose product conveyor.

Although this is not objectionable in the uses for which said prior dumpers were developed, certain products require extreme care in handling to prevent injury thereto and it is an object of the present invention to provide an improvement upon the aforesaid dumpers in which the surge above referred to will be substantially reduced and a higher degree of gentleness achieved in the dumping action.

A specific object of the invention is to provide a box dumper in which the loaded box is rolled over a fulcrum member to bring the leading edge of the lower side of the box relatively close to the loose product conveyor so that the product has only a short distance to move in gravitating from the box onto the loose product conveyor.

Another object is to provide such a box dumper in which the major flow of the product from the box is retarded until this close relationship of the box with the product conveyor has been achieved.

The manner of accomplishing the foregoing objects as well as further objects and advantages will be made manifest in the following description taken in connection with the accompanying drawings in which Fig. 1 is a diagrammatic side elevational view of a preferred embodiment of the invention and illustrates the same receiving a stack of open top boxes loaded with a loose product as when the stack has just engaged the overhead conveyor belts and is being lowered under control of said conveyor towards a position of rest on the stack elevator.

Fig. 2 is a front elevational view of Fig. 1 taken on the line 2—2 thereof with the stack of boxes removed.

Fig. 3 is a vertical sectional view taken on the line 3—3 of Fig. 2.

Fig. 4 is an enlarged plan view of the invention taken on the line 4—4 of Fig. 3 in which certain portions of the structure are broken away to reveal otherwise hidden details thereof.

Fig. 5 is a fragmentary enlarged cross sectional view taken on the line 5—5 of Fig. 2.

Fig. 6 is a detailed sectional view taken on the line 6—6 of Fig. 5 and illustrating a stack end guide of the invention.

Fig. 7 is a fragmentary operational view taken in the same plane as Fig. 3 and showing the stack just after it has been delivered to recline upon the inclined elevator and with its uppermost box pressed against the dumping belts with said upper box thus relieving the curtain supporting frame from contact with said belts and permitting said frame to swing to its inwardmost position relative to the path along which said stack is being elevated, with the curtain carried by said frame extending over the top of said box, and with the bottom of said box elevated approximately opposite the pivotal axis of the counter-balanced fulcrum member of the invention.

Fig. 8 is a view similar to Fig. 7 and illustrates a succeeding stage in the dumping of the loose product from the uppermost box in the stack in which the fulcrum member has rocked about its axis to its lower position, with the box still resting on the initial step section of said fulcrum member, and with the curtain still positioned to retain the product in the box with the box resting approximately upon its side.

Fig. 9 is a view similar to Fig. 8 and illustrates a succeeding stage in the dumping of the product from a box wherein the box has been rocked by the dumping belts onto the final step section of the fulcrum member and then further rocked about the leading edge of the lower side of the box whereby the weight of the product in the box acts to swing the curtain forwardly and produce a gentle flowing movement of the product downwardly and forwardly from the box directly onto the loose product conveyor.

Fig. 10 is a view similar to Fig. 9 and illustrates a successive step in the dumping of the product from a box by my invention in which the box has been emptied of product, all of which has been delivered onto the loose product belt, the box now being delivered onto an empty box conveyor, the empty box being shown as positioned in this view where it has just left contact with the counter-balanced fulcrum member permitting the latter to return to its normal position with the initial step section thereof parallel to and in contact with the adjacent side of the next uppermost box of the rising stack.

Fig. 11 is an enlarged cross-sectional detail view taken on the line 11—11 of Fig. 1 and illustrating the internal structure of the stack elevator.

Fig. 12 is an enlarged fragmentary cross-sectional detail view taken on the line 12—12 of Fig. 3.

Fig. 13 is an enlarged fragmentary cross-sectional detail view taken on the line 13—13 of Fig. 3.

Fig. 14 is a diagrammatic fragmentary perspective view illustrating structural details of the curtain supporting frame of the invention.

Fig. 15 is a fragmentary perspective detail view illustrating the internal structure of the counter-balanced fulcrum member of the invention.

Fig. 16 is an enlarged detail sectional view taken on the line 16—16 of Fig. 3.

Referring specifically to the drawings, the invention is therein shown as embodied in a stack conveying and elevating and box dumping apparatus 20 which is mounted on a pair of heavy angle members 21, the latter being set into and supported by a floor 22. The apparatus 20 includes a stack conveyor 23, a stack elevator 24, a stack controlling and box dumping conveyor 25, a loose product conveyor 26 and an empty box conveyor 27.

The stack conveyor 23 includes a pair of endless chains 28 which turn around suitable sprockets 29 which are carried on stub shafts 30, the latter being journalled in bearings 31 which are mounted on the angle members 21 and on brackets 32 which are supported on the elevator 24. The chains 28 travel in channel iron floor tracks 33 which are imbedded in floor 22 and are, therefore, horizontal excepting for the extremities thereof immediately adjacent the sprockets 29.

This downward inclination of the forward extremities of the tracks 33 towards the pitch lines of the sprockets 29 is for the purpose of causing each stack S of loaded boxes B travelling on the stack conveyor 23 to rock towards the stack elevator 24 as this stack is about to be delivered to said elevator, the purpose of this being made clear hereinafter.

The stack conveyor 23 is driven by power applied to the chains 28 thereof under controls which regulate the delivery of stacks S to the elevator 24 so that each of these stacks is delivered in a timed relation with the operation of said elevator in a manner well known in the art and which is not, therefore, described herein in detail.

The elevator 24 has a rigid frame structure 40, including side standards 41 (Figs. 1, 2, 3 and 11) the latter being secured by bolts 42 to the angle members 21 so as to support the elevator 24 thereon. A plurality of sets of holes 43 are provided in the standards 41 for the reception of the bolts 42 whereby the angular relation of the standards 41 with the angle members 21 may be varied by selecting one or the other of different sets of these holes for receiving said bolts when assembling standards 41 on the angle members 21.

The standards 41 are reverse duplicates of each other so that a description of one will suffice for both (Figs. 1, 2, 3 and 11). Each standard includes an outer housing channel 44 and an inner channel 45 which are held together by bolts 46, the channels 45 being rigidly connected by transverse channels 47, 48 and 49 which are welded thereto at vertically spaced intervals as shown in Fig. 3. The front flanges of channels 44 are reinforced by stack supporting wear plates 50 which are removably secured to said channels as by flat headed screws. The brackets 32, aforementioned, are secured to the plates 50 and channels 44 by bolts 51. Secured as by welding to a forward flange of the channel 45 is a vertical angle iron chain guide 52. Secured as by bolts 53 to an inner face of each channel 44 is an angle chain guide 54. Secured as by bolts 55 to cross channels 48 and 49 are angle iron members 56. Secured to the rear flange of channels 44 by bolts 60 are bearings 61, these bolts also securing to said channel angle brackets 62 having stop lugs 63 and pivotally supported on bolts 64 are counter-balanced chain safety latches 65.

Fixed on the outer faces of the angle members 56 at the upper ends of the standards 41 are cradle guiding cams 66. These cams are reinforced by brackets 67 which are bolted to cross channel 49. Supported on the cross member 47 and on suitable spacers connecting these with the standards 41 within the lower ends of the latter are cradle cams 68 and 69, each of the latter carrying a trap latch 70 pivotally mounted thereon, this latch normally resting on a lug 71 provided on the adjacent cam 68 (Fig. 3). The manner of operation of cams 66, 68 and 69 will be made clear hereinafter. Pivotally mounted on upper end walls 72 of the standards 41 are trap latches 73 which swing freely about their axes in the planes of the cam 66 and normally rest downwardly on the upper edges of the latter.

Journalled in bearings 77 mounted on lower end portions of the standards 41 are stub shafts 78 carrying sprockets 79 which rotate in the planes of the jam latches 65 (Fig. 11). Mounted on upper portions of the standards 41 are two pairs of bearings 80 and 81 in which shafts 82 and 83 respectively journal (Fig. 2). Journalling in bearings 61 is a shaft 84. The shaft 82 has keyed thereon sprockets 90, elevator chains 91 being trained about these and about sprockets 79 which lie in the same vertical planes therewith.

Fixed on one end of shaft 82 is a drive sprocket 92. Fixed on corresponding ends of shafts 83 and 84 are sprockets 93 and 94. Adjustably mounted on the adjacent outer face of a standard 41 (Fig. 1) is an idle sprocket 95. Trained about the sprockets 92, 93, 94 and 95 is an endless drive chain 96.

Fixed on the opposite end of shaft 84 is a master sprocket 97 which is driven by a chain 98 connecting this with a pinion sprocket 99 of a variable speed electric motor power unit 100. The master sprocket 97 preferably includes a conventional slip clutch which is set to slip when any jam occurs in the dumper 20 so as to minimize the resulting injury to boxes being handled therein.

The shaft 83 has a sprocket 101 fixed to its opposite end.

Carried between the elevator chains 91 are two equally spaced stack lifting cradles 105. Each cradle has a shaft 106 which is rigidly secured thereto along one edge thereof and on opposite ends of which rollers 107 freely rotate. Fixed to the opposite ends of the shaft 106 are arms 108 which extend downwardly at approximately a right angle with the cradle 105, the lower ends of said arms being pivotally secured to corresponding links of the chains 91 (Figs. 7 and 11). When the power unit 100 is energized to drive the elevator 24, it causes rotation of the shaft 82 in the direction of arrow 109 (Fig. 1) so as to cause the cradles 105 to successively rise in extended relation with the stack supporting wear plates 50 so as to lift each stack upwardly while the boxes thereof are successively dumped. When each cradle 105 arrives at the upper end of the elevator 24 the rollers 107 are cammed rearwardly by the upper end walls 72 of the standards 41. This causes these rollers to pass under the latches 73 and be trapped behind the cams 66 as the pivotal connections of that cradle 105 with the chains 91 pass over the sprockets 90. This results in the withdrawal of the uppermost cradle 105 from its extended position and its confinement within the standards 41 during its downward travel as shown in Fig. 7.

When one of the cradles 105 approaches the lower end of the elevator 24 the rollers 107 thereof engage cam 68 which swings this cradle forwardly, the latches 70 yielding to allow said rollers to pass forwardly between the cams 68 and 69, and then dropping to trap these rollers in their forward positions and guide them upwardly between the forward flanges of the channels 44 and 45 as shown in Fig. 3.

A frame superstructure 115 is mounted on the upper end of the frame structure 40 by means of heavy plates 116 which are welded or otherwise secured to upper outer faces of the standards 41. The superstructure 115 includes a pair of spaced horizontal channel members 117 to which trapezoidal plates 118 are welded so that said plates lie against inner faces of the channels 117. The plates 118 have flanges 119 and 120 bent from opposite edges thereof below the channels 117 for strengthening purposes and these plates are secured to the plates 116 by bolts 121. Welded to the flanges 119 are bearing lugs 122. Formed in portions of the plates 118 disposed between the interned flanges of the channels 117 are arcuate cam slots 123.

The overhead box dumping conveyor 25 includes bearing supports 130 which are fixed on the right hand ends of the channels 117 and extend upwardly therefrom. These supports carry bearings 131 in which a shaft 132 journals. Fixed to the shaft 132 are drive pulleys 133 and a driven sprocket 134 the latter being connected by a chain 135 to the sprocket 101 (Figs. 1, 2 and 4). Provided on supports 130 are brackets 136 to which bolts 137, pivotally connect front ends of conveyor frame shafts 138. The opposite ends of these shafts are connected by turnbuckles 139 to short shafts 140 carrying bearings 141 for an idle conveyor shaft 142 on which are mounted pulleys 143 which are aligned with the pulleys 133. The shafts 138 and 140 are held in rigid spaced relation by members 150, 151 and 152 which are alike so that a description of one will suffice for all. Each of these members includes a transverse channel 153 (Fig. 16) which is welded to the inner of two plates 154 which in turn are welded to a horizontally bored block 155, which blocks slidably receive the shafts 138 and 140. The plates 154 extend downwardly below said block to form a pivotal connection with a head 156 of one of three pairs of arms 160, 161 and 162. Each of blocks 155 has set screws 163 by which said blocks are adjustably positioned on the shafts 138 and 140. Connecting the lower ends of the arms 160 is a shaft 165 carrying idle pulleys 166 which are held in alignment with the pulleys 133 by collars 167.

Trained about the pulleys 133 and 143 is a pair of conveyor belts 170 on the lower flights 171 of which the pulleys 166 rest. Corresponding ends of two coil springs 172 connect to outwardly extending ends of shaft 165, the opposite ends of these springs being secured by brackets 173 to the bearing supports 130.

Fixed in lower ends of arms 161 is a shaft 174 which carries idle pulleys 175 spaced by collars 176 to rest on the lower belt flights 171 (Fig. 4). Attached to outer ends of the shaft 174 are coiled springs 177, opposite ends of which connect with brackets 178 fixed on outer faces of channel members 117 (Fig. 1).

The springs 172 (Fig. 1) yieldably swing the arms 160 downwardly which presses the pulleys 166 against the inside of the lower flights of the belts 170. Springs 177 cause rollers 175 to function in a similar manner except that they draw the arms 161 to rest yieldably against respective stops 154a carried by member 151. In this way the belts are always kept tight and the center portion of the lower flights 171 is always positioned to properly engage a box to be dumped.

Fixed on upper edges of channel frame members 117 is a pair of clevises 180 in which lower ends of hollow cylinders 181 are pivoted, these confining coiled compression springs 182. These cylinders are located beneath and slidably receive arms 162 which ride on springs 182 to afford a cushioned support to the free end of conveyor 25.

Empty box conveyor 27 (Figs. 3 and 10) comprises a short section of roller conveyor 185 which lies between left end portions of channels 117. The left end of said section is pivoted on a horizontal axis on said channels. The right end of section 185 is yieldably supported on rods 186 which connect pivotally therewith and extend up therefrom through suitable holes formed in upper flanges of channels 117 and through coiled expansion springs 187, to receive washers 188 and nuts 189 (Fig. 3).

The loose product conveyor 26 (Fig. 3) is located just below the empty box conveyor 27 and the right hand or receiving end thereof is located closer than conveyor 27 to the upper end of elevator 24 and approximately on the same level as the latter. Conveyor 26 is shown diagrammatically as a power driven belt but may comprise any kind of conveyor adapted to carry away loose product delivered thereto by the box dumper 20. It is to be understood that the side guards which are normally provided for conveyor 26 to prevent product rolling from the sides of said conveyor, are omitted in order to simplify the drawing.

Mounted between the inclined path along which elevator 24 lifts stacks of boxes, and the receiving end of product conveyor 26 are a fulcrum member 200 and a loose product control mechanism 201 (Figs. 3, 5, 14 and 15).

The fulcrum member 200 comprises an initial step section 205 and a final step section 206 which are joined together at their meeting edges by a continuous hinge 207 (Fig. 15). The initial step section 205 has a wide notch 208 cut from its lower edge to accommodate passage of stack cradles 105 from extended to retracted position as shown in Fig. 3, and is provided with a pair of collars 209 adjacent this lower edge (Fig. 13). Fixed in these collars are a short shaft 210 and a shaft 211 (Fig. 13), these shafts journalling in suitable aligned holes formed in plates 118, the outer end of the shaft 211 being bent to form an arm 212 which extends to the right and adjustably carries a counter-balance weight 213 (Fig. 1). This weight constantly rotates the fulcrum member 200 to bring the initial step section 205 thereof into contact with a pair of rubber cushions 214 (Fig. 5) which are mounted in boxes 215 welded to the inner faces of the plates 262. A stiffening bar 216 is secured to the bottom face of initial step section 205 close to the upper edge thereof.

The final step section 206 is preferably formed of a sheet of metal bent against itself at the leading edge 220 of said member (Fig. 15) so as to provide an apron 221, there being a slight space between said section and said apron into which slightly bent leaf springs 222 extend, opposite ends of these springs being secured by clamps 223 to the initial step section 205. Suitable gaps are provided in the hinge 207 through which springs 222 extend. The apron 221 is secured as by rivets 224 to the final step section 206 so that the degree of flexing between the sections 205 and 206 is governed by the springs 222 which are relatively stiff and the function of which will be made clear hereinafter in describing the operation of the invention. The entire upper face of the fulcrum member 200 is preferably covered with a resilient plastic coating 200a approximately ⅛ inch thick.

The product control mechanism 201 includes a shaft 225 opposite ends of which journal in bearing lugs 122. The leading edge of a sheet metal back board 226 is mounted on the shaft 225 opposite end edges of said back board being bent downwardly and welded to collars 227. The mechanism 201 also includes a rectangular frame 230 having side members 231 which are connected at their upper and lower ends by arcuate cross members 232 and 233, which are welded to inner faces of said side members 221. Also so welded, just inwardly from said cross members 232 and 233, are collars 234 and 235 the holes of said collars continuing through said side members. Shaft 236 is supported in the collars 234 and fixed therein by suitable set screws. Suspended rotatably on shaft 236 is a curtain 237 which may be formed of heavy belting, sheet rubber or the like, this curtain being supported on shaft 236 by a series of clips 238 provided along its upper edge. Extending through the collars 235 and fixed therein by suitable set screws is a shaft 240 this shaft also extending through the collars 227 of the back board 226 (Figs. 5 and 14) so as to pivotally connect the members 231 with the back board 226.

Members 231 are provided with short rearward extensions 241 (Fig. 14) carrying pins 242 which extend outwardly therefrom through the arcuate cam slots 123 and carry flanged rollers 243 which space the members 231 from the plates 118 and extend into the slots 123 so as to support the frame 230 on said rollers. The action of curtain frame 230 and back board 226 is thus determined by the shape of cam slots 123. Disposed between the plates 118 and the channel members 117 and connected to the pins 242 are contractile coil springs 250 the opposite ends of which connect with suitable brackets 251 which are secured to inner faces of the channel members 117 (Figs. 7 and 14).

Clamped in place against inner faces of plates 118 adjacent the inner ends of the arcuate cam slots 123 by clamps 252 (Fig. 5) are rubber blocks 253 which serve as cushion stops for the frame 230 when this is free to be drawn by the springs 250 into its extreme rightward position.

Secured to the flanges 120 by bolts 260 (Figs. 5 and 13) and to the upper flanges of members 117 by bolts 261 are triangular sheet metal guards 262 which are shaped to guide the upper box of a stack into centered relation with the machine and prevent the ends of the box catching on stops 214 and 253 or on side members 231 of the frame 230.

*Operation*

As before noted the elevator 24 is set in operation by energizing the power unit 100 which also drives the overhead belt conveyor 25 through the chain 135. With the dumper 20 thus running and with power applied to the product conveyor 26 so as to cause the upper flight thereof to travel in the direction of the arrow adjacent thereto, a stack of boxes S is caused to be fed along the floor track conveyor 23 so that this tilts to bring the upper end of the stack into engagement with the lower flights 171 of the overhead belts 170 as shown in Fig. 1. The uniform, relatively slow rate at which the belts 170 travel, and the pressure with which these belts are held taut by the springs 172 and 177, causes the downward tilting of this stack to be controlled to prevent an acceleration of the tilting of this stack by gravity which would produce such a shock upon its stopping against the elevator 40 as would be injurious to the product carried in the boxes.

It is to be noted that the idle pulleys 166 and 175 are pulled downwardly against the lower flights 171 of belts 170 by the springs 172 and 177 so that, as the pulleys 166 are swung upwardly out from in front of the path of the uppermost box of the stack entering the dumper, rollers 175 automatically swing downwardly into the path of the stack so as to maintain belts 170 frictionally engaging the leading corner of the uppermost box so as to positively prevent escape of the stack from control by the belts 170 and thereby cause the entire downward swinging of the stack to be held to a rate determined by the speed of travel of the conveyor 25. This results in the stack being deposited gently in a position of rest against the stack supporting wear plates 50 with the upper box related to the belts 170 approximately as shown in Fig. 7.

Prior to the stack entering the machine, the upper cross bar 232 of the curtain supporting frame 230 had been engaged by the belts 170 to hold this frame in a leftward position as shown in Figs. 1, 3 and 5. The arrival of the stack in the position shown in Fig. 7 lifts the belts 170 from their position blocking the frame 230 and permits the latter to be swung by the springs 250 into its inwardmost position as shown in this view, and in which the curtain 237 has been shifted above the uppermost box of the stack in a position of partially covering the open top thereof and especially the portion adjacent the lower side of said box.

As the movement of the belts 170 is continuous the stack S no sooner arrives in the position in which it is illustrated in Fig. 7 than the frictional engagement between the upper rear edge of the uppermost box with the belts 170 causes this box to be rolled leftward with the following results:

The counter-balanced fulcrum member 200 yields before the box and supports the box on the initial step section 205 of this member as the box begins to rotate therewith about the axis of the shafts 210 and 211 on which this member is mounted. The upper edges of the box ends also engage the arcuate cross member 232 of the curtain frame 230 and shift the latter ahead of the box causing the rollers 243 to progress along the cam slots 123.

The next step in the progressive dumping of the uppermost box of the stack is shown in Fig. 8 where we see the curtain 237 is disposed in covering relation with the lower portion of the open top of the box so as to momentarily retard the flow of the loose product from the box.

The downward shift of the center of gravity of the loaded box as this center moves over the pivotal axis of the fulcrum member 200 results in a flexing of the springs 222, embodied in the fulcrum member 200, immediately after the latter comes to rest in its lowermost position, which just follows the step in the dumping operation illustrated in Fig. 8. The flexing of these springs acts as a shock absorber to yieldably halt the downward movement of the center of gravity of the loaded box and gives a slight rebound to the box as it is rolled from the position in which it is shown in Fig. 8 to the position in which it is shown in Fig. 9 in which the leading edge of the lower side of the box is located quite close to the upper surface of the loose product conveyor 26. This rebound tends to loosen the product and give it a fluid character at the instant illustrated in Fig. 9 which is just the moment when the box has reached a semi-inverted position with the open top of the box relatively close to the receiving surface of the loose product conveyor with the result that the mass of loose product in the box overcomes the retarding tendency of the curtain 237 and swings the latter outward, flowing past it onto the conveyor 26.

Continuing to roll to the leftward as the angle of inversion of the box increases, the box is quickly emptied of loose product by this gravitating therefrom onto the conveyor 26. Some of this product tends to flow backwardly off the receiving end of the conveyor 26 and the loss of any loose product from the conveyor 26 because of this tendency is prevented by the backboard 226 being tilted upwardly at a relatively steep angle by the frame 230 by virtue of the latter being depressed under the empty box as this box is propelled further along its way and up onto the empty box conveyor 27 which it depresses, in entering upon the same, as shown in Fig. 10. The need for this positioning of the backboard 226 to prevent a back flow of product from off the receiving end of conveyor 26 is temporary and all of the product discharged from the box (shown as just having been emptied in Fig. 10) has moved out of contact with the backboard 226 and along the conveyor 26 by the time this box is propelled by the conveyor 25 entirely onto the empty box conveyor 27. When the empty box has thus travelled away from over the curtain supporting frame 230 the latter is free to respond to the springs 250 and return to its original position as shown in Fig. 5, which also lowers backboard 226 to its initial position shown in this view.

It is to be noted in Fig. 10 that before this happens the box being emptied moves away from over the fulcrum member 200, causing the latter to be restored quickly by the action of its counterbalanced weight 213 to the normal position of this member shown in Figs. 5 and 10.

The dumping of each succeeding box in a stack is accomplished in precisely the same manner as that described above for the original uppermost box of the stack, as each box in turn becomes the uppermost box.

From the above description of a preferred embodiment of the invention and the manner in which the same operates, it is believed manifest that I have provided an improvement in box dumpers in which the loaded box is rolled over a fulcrum member in such a manner that the leading edge of the lower side of the box is brought relatively close to the loose product conveyor at the time the dumping takes place so that the product has only a short distance to move in gravitating from the box onto the loose product conveyor.

It is also believed manifest that I have provided such a dumper in which the major flow of the product from the box is retarded until the close relationship of the box with the product conveyor above described has been accomplished. It is believed further evident that with these improvements the tendency of the loose product to surge from the box when dumping this product therefrom has been substantially reduced and a more gentle handling of the loose product achieved in the dumping operation.

While the invention is illustrated and described as embodied with an overhead belt stack controlling box dumper, it is to be understood that the novel features of my invention have wide utility and application in many varying forms without departing from the spirit of the invention or the scope of the appended claims.

I claim:

1. In a stack dumper the combination of: an elevator adapted to receive and elevate a stack of loaded open top boxes along a given path; a fulcrum member pivotally mounted on a horizontal axis at one side of said path and extending upwardly from said axis; means to bias said fulcrum member towards said position but permitting it to yield resistingly therefrom away from said path; a loose product conveyor on the opposite side of said fulcrum member from said path for receiving the product from a box; an empty box conveyor above said product conveyor for receiving an empty box; a flexible belt; means for suspending said belt in stretched condition and extending across said path and over said fulcrum member and empty box receiving conveyor so that said belt is engaged by the uppermost portion of the uppermost box of said rising stack; and means for moving said belt lengthwise across said path to frictionally engage and roll said box against and over said fulcrum whereby the latter is caused to yieldingly rock about its axis to gently lower said box to bring the leading edge of the lower side of said box close to said product conveyor and tilt said box while so positioned towards said conveyor causing the product to flow from said box onto said product conveyor, the movement of said belt continuing to shift said box to deliver the latter when empty onto said empty box conveyor.

2. A combination as in claim 1 in which a yieldable curtain mount is provided; a curtain carried by said mount; means biasing said mount towards said path so as to shift said curtain over the top of the uppermost box of a stack when the latter rises into engagement with said belt said means yielding with the movement of said box, as the latter is rolled by said belt as aforesaid, to maintain said curtain in covering relation with the open top of said box as said box rocks downwardly into product dumping relation with said product conveyor, said curtain being free to then yield to pressure of said product to permit the latter to gravitate from said box onto said product conveyor.

3. In a stack dumper the combination of: an elevator adapted to receive and elevate a stack of loaded open top boxes along a given path; a fulcrum member at one side of said path; a loose product conveyor on the opposite side of said fulcrum member from said path for receiving product from a box; an empty box conveyor above said product conveyor for receiving empty boxes; a curtain; a curtain mount carrying said curtain and biased toward a position in which said curtain overlies the open top of an uppermost box of a stack in said dumper; a flexible belt; means for suspending said belt in a stretched condition and extending through said path and over said fulcrum member so as to be engaged by the uppermost portion of the uppermost box of said rising stack; and means for moving said belt lengthwise across said path to frictionally roll said box against and over said fulcrum member, said curtain mount being engaged by and yielding before said box, as it is rolled by said belt, to retain said curtain in covering relation with the open top of said box until the leading edge of the lower side of said box is relatively close to said loose product conveyor, whereupon said curtain yields before the weight of the product in said box to permit said product to gravitate past said curtain and onto said product conveyor, and said box, thus emptied, is propelled by said belt over said curtain and onto said empty box conveyor.

4. In a stack dumper the combination of: an elevator adapted to receive and elevate a stack of loaded open top boxes along a given path; a fulcrum member eccentrically pivoted along its lower edge on a horizontal axis close to said path and close to the bottom of the uppermost box of said stack when said box arrives in position to be dumped; means to bias said fulcrum member upwardly into parallelism with said box and close to one side thereof, but permitting said fulcrum member to yield resistingly away from said path; a loose product conveyor on the opposite side of said fulcrum member from said path for receiving the contents of a box; an empty box conveyor above said loose product conveyor to receive an empty box; and a box rolling mechanism for engaging said box when in a position to be dumped as aforesaid and shifting the latter against said fulcrum member to rock the box and said member about said axis whereby the leading edge of the bottom side of said box is lowered into proximity with said loose product conveyor and the product in the box caused to gravitate onto said conveyor, said box propelling means continuing to engage and propel said box whereby said box is shifted onto said empty box conveyor, said fulcrum member returning to its original position when dis-engaged by said box.

5. In a box dumper the combination of: means for delivering a loaded open top box into a non-inverted position; a fulcrum member mounted pivotally on a horizontal axis disposed close to one side of said box; means for applying a rotative bias to said member resisting rotation thereof away from said box, and returning said member to its original position when it is released; a loose product conveyor on the opposite side of said fulcrum member from said box; an empty box conveyor disposed above said product conveyor; and means for propelling said box against said fulcrum member to rock the latter about its axis towards said product conveyor with said box resting on said fulcrum member until the leading edge of the lower side of said box approaches close to said product conveyor and said box assumes a semi-inverted position causing product therein to gravitate therefrom onto said product conveyor said box propelling means continuing to operate on said box to propel the latter, when emptied, onto said empty box conveyor.

6. A combination as in claim 5 including a curtain; means for movably mounting said curtain said means biasing said curtain towards a position above said box, when the latter is initially propelled against said fulcrum member, so as to cover a portion of the open top of said box, as said box moves into the aforesaid semi-inverted position, to retain the product in said box against premature gravitation therefrom until said leading edge of said lower side of said box approaches close to said product conveyor said curtain then yielding to the weight of said product to permit the latter to be discharged onto said product conveyor, said curtain mount yielding downwardly to permit said box propelling means to continue propelling said box after it is emptied, onto said empty box conveyor.

7. A combination as in claim 6 including a back board located along the receiving end of said product conveyor; and means for elevating said back board to prevent product backing off the receiving end of said conveyor as said box is fully inverted at the conclusion of the dumping operation and shifted away from over said fulcrum member whereby the latter is restored to its initial position.

8. A combination as in claim 7 in which said box propelling means comprises an overhead endless belt conveyor which is positioned to frictionally engage each box delivered into dumping position and rotate said box in propelling the same as aforesaid from its initial position towards its inverted empty position on said empty box conveyor; and means yieldably supporting the receiving end of said empty box conveyor whereby the latter yields downwardly to accommodate the empty box between said empty box conveyor and said overhead box propelling conveyor.

9. In a box dumper the combination of: means for delivering a loaded open top box into a non-inverted position; a fulcrum member disposed close to one side of said box when so positioned and close to the bottom of said position; a loose product receiving conveyor on the opposite side of said fulcrum member from said box; a curtain adapted to cover a portion of the open top of said box during the dumping operation; a shiftable mount for said curtain which biases said curtain towards a position in which said curtain is above said box and covering a portion of the open top thereof in the initial phase of the box dumping operation; and means to engage said box and roll the same towards and over said fulcrum member to bring the leading edge of the lower side of said box close to said product conveyor with the box in semi-inverted position, said mount yielding with said curtain to pressure of said box thereagainst as said box is so rotated whereby said curtain covers a portion of the open top of said box to retain the product within said box until the latter reaches its semi-inverted position aforesaid whereupon said product gravitates against said curtain, swings this aside and is discharged onto said product conveyor, said box propelling means continuing to propel said box towards said empty box conveyor whereby said box is delivered over said curtain onto said empty box conveyor.

10. A combination as in claim 9 in which said curtain mount includes side arms located beyond opposite ends of said box in its initial position, a curtain supporting element uniting said arms from which said curtain is suspended; guide means for said arms to determine the path of said mount when yielding before said box as aforesaid, and springs connected to said arms to return said mount and curtain to their initial position each time an empty box is propelled onto said empty box conveyor and out of contact with said mount.

11. A combination as in claim 10 in which a back board is provided along the receiving end of said loose product conveyor said back board being connected to said side arms of said curtain mount whereby said back board is elevated as said curtain is depressed by a box, just inverted and emptied of product, whereby said product is retained by said back board on said loose product conveyor.

ERNEST A. VERRINDER.

No references cited.